United States Patent
Lossev et al.

(10) Patent No.: US 7,174,043 B2
(45) Date of Patent: Feb. 6, 2007

(54) ON-LINE HANDWRITING RECOGNIZER

(75) Inventors: Ilia Lossev, Mountain View, CA (US); Natalia Bagotskaya, Mountain View, CA (US)

(73) Assignee: EverNote Corp., Sunnyvale, CA (US)

(*) Notice: Subject to any disclaimer, the term of this patent is extended or adjusted under 35 U.S.C. 154(b) by 649 days.

(21) Appl. No.: 10/374,482

(22) Filed: Feb. 25, 2003

(65) Prior Publication Data

US 2004/0165777 A1 Aug. 26, 2004

(51) Int. Cl.
*G06K 9/00* (2006.01)
*G06K 9/18* (2006.01)

(52) U.S. Cl. .......................... 382/187; 382/186

(58) Field of Classification Search ............ 382/159, 382/173, 181, 186–188, 199, 201–203, 209, 382/218, 226, 229
See application file for complete search history.

(56) References Cited

U.S. PATENT DOCUMENTS

| | | | | |
|---|---|---|---|---|
| 5,303,312 | A * | 4/1994 | Comerford et al. ......... | 382/189 |
| 5,742,705 | A * | 4/1998 | Parthasarathy .............. | 382/185 |
| 5,889,889 | A | 3/1999 | Sinden ........................ | 382/187 |
| 5,903,668 | A | 5/1999 | Beernink .................... | 382/187 |
| 6,052,481 | A | 4/2000 | Grajski et al. .............. | 382/187 |
| 6,307,964 | B1 * | 10/2001 | Lin et al. .................... | 382/203 |
| 7,003,158 | B1 * | 2/2006 | Bennett et al. ............. | 382/187 |

OTHER PUBLICATIONS

Christopher G. Small, "The Statistical Theory of Shape," Springer-Verlag, New York, 1996, pp. 1-26.

I-Jong Lin and S.Y. Kung, "Coding and Comparison of DAGs as a Novel Neural Structure with Applications to On-Line Handwriting Recognition," IEEE Transactions on Signal Processing, 45(11):2701-8, Nov. 1997.

(Continued)

*Primary Examiner*—Daniel Mariam
(74) *Attorney, Agent, or Firm*—Blakely, Sokoloff, Taylor & Zafman

(57) ABSTRACT

A character recognizer recognizes a handwritten input character. A sequence of points in two dimensional space representative of a stroke trajectory forming the input character is gathered. An input Directed Acyclic Graph is built with nodes representative of singular points at the beginning, end, and along the trajectory of the input character and with edges between nodes representative of an edge trajectory formed by the sequence of points of the input character between the singular points. Each edge in the input graph is described based on the shape, orientation and pen lift of the edge trajectory that the edge represents. The input graph is evaluated against model graphs, which are also Directed Acyclic Graphs, for all possible characters to find a path through a model graph that produces a best path similarity score with a corresponding path through the input graph. The input character is identified as an answer character represented by the model graph producing the best path similarity score. Each model graph for a reference character has nodes representative of singular points at the beginning, end, and along the stroke trajectory of the reference character. Edges between nodes in the model graph are representative of an edge trajectory formed by the sequence of points of the reference character between the singular points. Further each edge of the model graph has an "i" vector, a "j" vector and a "k" vector, and the "i,j,k" vectors indicate similarity values associated with the edge trajectory of the reference character and typical shapes, shape rotation and pen lift, respectively.

34 Claims, 10 Drawing Sheets

OTHER PUBLICATIONS

I-Jong Lin and S.Y. Kung, "A Novel Learning Method by Structural Reduction of DAGs for On-Line OCR Applications," International Conference on Acoustic, Speech, and Signal Processing, 1998.

D. Kanevsky, "A Generalization of the Baum Algorithm to Functions on Non-Linear Manifolds," In Proc. International Conference on Acoustic, Speech and Signal Processing, vol. 1, p. 473-476, 1995.

L. Rabinber, "A Tutorial on Hidden Markov Models and Selected Applications in Speech Recognition," Proceedings of IEEE, 77(2):257-86, Feb. 1989.

Yen-Kuang Chen, "Neural Structure of DAGs," www.ee.Princeton.edu/~ijonglin/spaces/node16.html, Sep. 25, 1998.

PCT International Search Report for PCT/US2004/005272.

Bellegarda, E.J. et al., "On-Line Handwritten Character Recognition Using Parallel Neural Networks," proceedings of the International Conference on Acoustics, Speech, and Signal Processing (ICASSP), vol. 2, Conf. 19, Apr. 19, 1994, pp. II-605-II to II-608.

"Method for Supporting Stroke Variations in Online Handwritten Character Recognition," IBM Technical Disclosure Bulletin, IBM Corp., New York, vol. 35, No. 5, Oct. 1, 1992, pp. 358-359.

I-Jong Lin et al., "Coding and Comparison of DAGs as a novel neural structure with applications to on-line handwriting recognition," IEEE Trans. Signal Process, IEEE Transactions on Signal Processing, IEEE, vol. 45, No. 11, Nov. 1997, pp. 2701-2708.

\* cited by examiner

MODEL CHARACTER EDGE TABLES

| i TABLE | | | j TABLE | | | k TABLE | |
|---|---|---|---|---|---|---|---|
| i | SIM.VALUE | | j | SIM.VALUE | | k | SIM.VALUE |
| 1 | 12 | | 0 | 50 | | 1 | 25 |
| 2 | 9 | | 1 | 70 | | 2 | 60 |
| 3 | 16 | | 2 | 90 | | ⋮ | |
| 4 | 18 | | 3 | 75 | | 8 | 35 |
| ⋮ | | | ⋮ | | | | |
| 36 | 89 | | 24 | 90 | | | |
| 37 | 86 | | | | | | |
| 38 | 95 | | | | | | |
| 40 | 82 | | | | | | |
| ⋮ | | | | | | | |
| 127 | 45 | | | | | | |
| 128 | 51 | | | | | | |

ON-LINE HANDWRITING RECOGNIZER

FIELD OF THE INVENTION

This invention relates to recognizing handwritten characters. More particularly, the recognizer operates at a rate such that it is capable of recognizing handwriting as the characters are being written—for example, pen and tablet input to a computing system.

BACKGROUND OF THE INVENTION

With the advent of tablet computers with handwritten pen input and with the advent of handwritten pen input for composing messages to be sent on the internet, there is an increasing need for a real time or on-line character recognizer.

In the past, a character recognizer has used a set of reference symbols and a procedure of estimating the similarity between input handwritten trajectory and the trajectory of a given reference symbol. The recognition answer is the reference symbol that has maximum similarity between its trajectory and the input trajectory.

In "Coding and comparison of DAGs (Directed Acyclic Graphs) as a novel neural structure with applications to on-line handwriting recognition," by I-John Lin and S. Y. Kung (IEEE Transactions on Signal Processing, 45(11): 2701–8, November 1997, both the description of input trajectory and the description of the trajectory for each reference symbol are Directed Acyclic Graphs (DAGs). Having a certain similarity function defined on pairs (input graph edge, model graph edge), i.e. having a score assigning to any edge of direct product of these two graphs, one can use a dynamic programming procedure for calculating similarity score of these graphs. Different paths connected between initial and last nodes in input graph (and the same in the model graph) can be interpreted as possible alternative descriptions of input trajectory (model trajectory). The main advantage of this approach is a possibility of choosing different descriptions of the same input segment while estimating its similarity to different symbol models.

This approach in general terms was described in "Coding and comparison of DAGs as a novel neural structure with applications to on-line handwriting recognition," by I-John Lin and S. Y. Kung (IEEE Transactions on Signal Processing, 45(11):2701–8, November 1997.

SUMMARY OF THE INVENTION

This invention relates to a new design of single character on-line handwriting recognizer. This recognizer can be used in handwriting recognition applications, as one parts of separate character recognizer or as one part of cursive/mixed handwriting word recognizer. Input for recognizer is the trajectory of one handwritten character. The input trajectory is a sequence of points in two-dimensional space with an extrapolation into three dimensional space to handle pen lifts from the writing surface.

In the present invention there is a novel description of handwritten trajectory for input graphs and also a novel process of building reference model graphs during a training procedure for creating the model graphs.

In this invention some features include (1) a new way of input trajectory description; (2) a new way of creating reference symbol model graphs; and (3) a generalization of HMM (Hidden Markov Model,—'A tutorial on hidden markov model and selected applications in speech recognition," by L. Rabiner, Proceedings of IEEE, 77(2):257–86, February 1989) training approach for the case of DAG description of input data when creating the model graphs, which allows the optimization of similarity function by adjusting parameters assigned to each model graph.

The DAG of an input character represents an input trajectory where a node of the graph corresponds to either a predetermined curvature rate change of the trajectory, the beginning of a character stroke or the end of a character stroke for the input character. A character stroke is part of the trajectory making up a character. A character stroke begins when the pen lands on the writing surface, and ends when the pen lifts off the writing surface. A character may have more than one character stroke. An edge of the DAG corresponds to a trajectory segment between two nodes where the trajectory also includes reconstructed "air" segments (where the pen off the writing surface and traverses a path in the air to a point where it begins the next stroke).

Each edge is characterized by three discreet parameters. A first parameter characterizes a rotation-independent shape of a segment of the character trajectory. The parameter represents a typical character-part shape as the closest shape from a predefined codebook of typical shapes. The codebook uses rotation invariant shapes. A second parameter of the edge described the orientation of the shape—the orientation is calculated as a quantized direction of the largest principal axis (eigenvector with the smallest eigenvalue of covariation matrix). A third parameter is quantized relative length of the "air" portion of a given edge.

In the feature of the invention related to creating reference character model graphs, the graphs are created in three stages. First, a vector quantization process is used on a set of raw samples of handwriting symbols to create a smaller set of generalized reference characters or symbols. Second, a character reference model graph structure is created by merging each generalized form model graph of the same character into a single character reference model graph. The merging is based on weighted Euclidian distance between parts of trajectory assigned to graph edges. As a last part of this second stage "type-similarity" vectors are used to describe similarities of given model edge to each shape of the codebook described above and to each possible quantized value of other input graph edge parameters. Thus, similarity functions, or similarity values, are defined by different tables on different model edges. This is essential for both time consideration purposes and the possibility of third stage learning described below.

In the third stage model creation further consists of minimizing recognition error by adjusting model parameters, i.e. similarity values. As in the HMM approach an appropriate smoothing approximation is used in the calculation of similarity score between input graph and model graph based on best matching paths. We approximate a best path similarity by all-paths similarity. Of course, instead of a sequence of observations as in HMM, there is a much more complex object, the observation DAG. Also dynamic programming method is used for time-efficiency in calculation of similarity scores. Finally, a generalized Baum algorithm ("A generalization of the Baum algorithm on nonlinear manifolds," by D. Kanevsky, In Proc. International Conf. on Acoustic, Speech and Signal processing, vol. 1, pp. 473–476) is applied for minimization of any appropriate error function. A gradient descent method can also be applied.

The invention summarized above may be implemented as a computer process, a computing system, or as an article of manufacture such as a computer program product or computer readable media. The computer readable media may be a computer storage media readable by a computer system and encoding a computer program of instructions for executing a computer process. The computer program readable media may also be a propagated signal on a carrier readable by a computing system and encoding a computer program of instructions for executing a computer process.

The above and various other features as well as advantages, which characterize the present invention, will be apparent from a reading of the following detailed description and a review of the associated drawings.

BRIEF DESCRIPTION OF DRAWINGS

FIG. 10 shows examples of "i, j, k" tables used to define each edge in a model graph.

FIG. 13 shows an example of multiple forms of the character "a" that will be merged into a single model graph.

DETAILED DESCRIPTION

Figure 1:
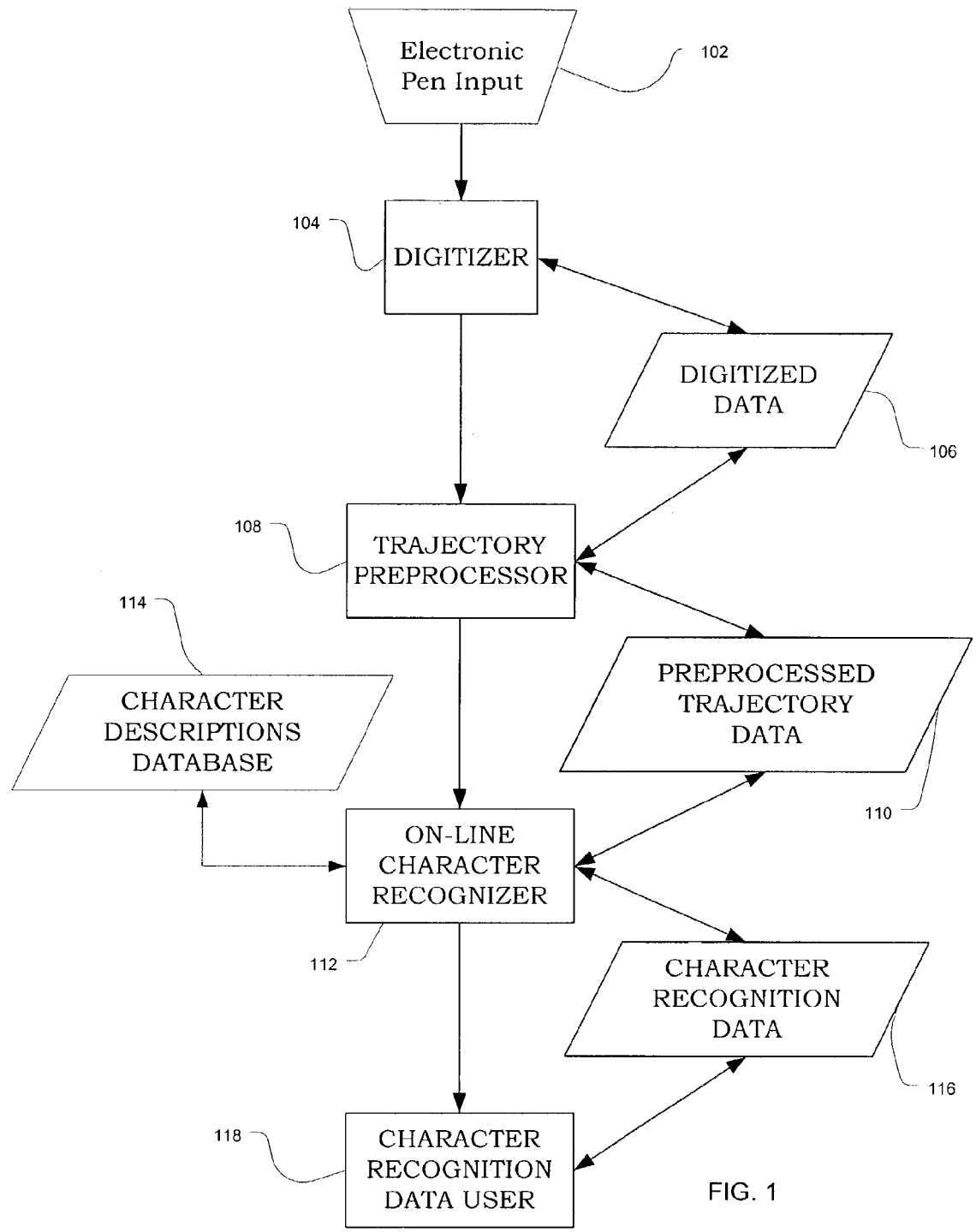
FIG. 1 shows the recognizer in a larger system using the character recognizer to read handwritten input.

FIG. 1 shows the hand written character recognizer in a system using the character recognizer to transform handwritten character input into electronic character data. Characters as used herein refers to alphanumeric characters as well as symbols. Typical input to a system using the recognizer would be electronic pen input, as in the case of a pen writing on a tablet, a display screen, or a cursor pad. The electronic pen input provides a stroke trajectory which is a sequence of X-Y coordinate points in two dimensional space along a trajectory followed by the pen input. The sequence of X-Y points digitized by digitizer 104 is stored as trajectory digitized data 106. This digitized data 106 is available to the trajectory preprocessor 108.

Trajectory preprocessor 108 will typically clean up the digitized data and segment handwritten words (strings of characters) into handwritten characters for recognition. Thus, the output of the trajectory preprocessor would be a sequence of points for each segmented character of a string of characters. Of course, there are multiple possibilities in doing the segmentation of characters in a handwritten word. Thus, the preprocessed trajectory data may include multiple segmentation points and therefore multiple possible characters for recognition by the character recognizer 112. Any type of segmentation process may be used, and segmentation is not a part of the character recognizer which is the subject of the present invention.

The character recognizer 112 will work with a sequence of points making up the trajectory of one or more strokes for each character it retrieves from the preprocessed trajectory data 110. The recognizer also makes use of the character descriptions in the character description database 114 to produce character recognition data 116. The character recognition data will typically be an identification of the character recognized along with some similarity score or confidence value that the recognition is correct. This character recognition data may be used by the character recognition data user 118 in any number of ways. Most typically it would be used to recognize the input word by making use of word recognition techniques not a part of the present invention.

The embodiments of the present invention are directed at the character recognizer 112, which will now be described in more detail and with various embodiments in the remaining FIGS. 2–13. Also, while the recognizer 112 is described herein as an on-line character recognizer, it will be apparent to one skilled in the art that the techniques used by the recognizer could just as well be used in recognizing off-line input data. In other words, the digitized data 106 might also be generated by a scanner scanning a handwritten document and having the scanned image digitized by a digitizer, such as digitizer 104 and stored as X-Y points on trajectories of handwritten characters as digitized data 106.

The logical operations of the various embodiments of the present invention are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 2:
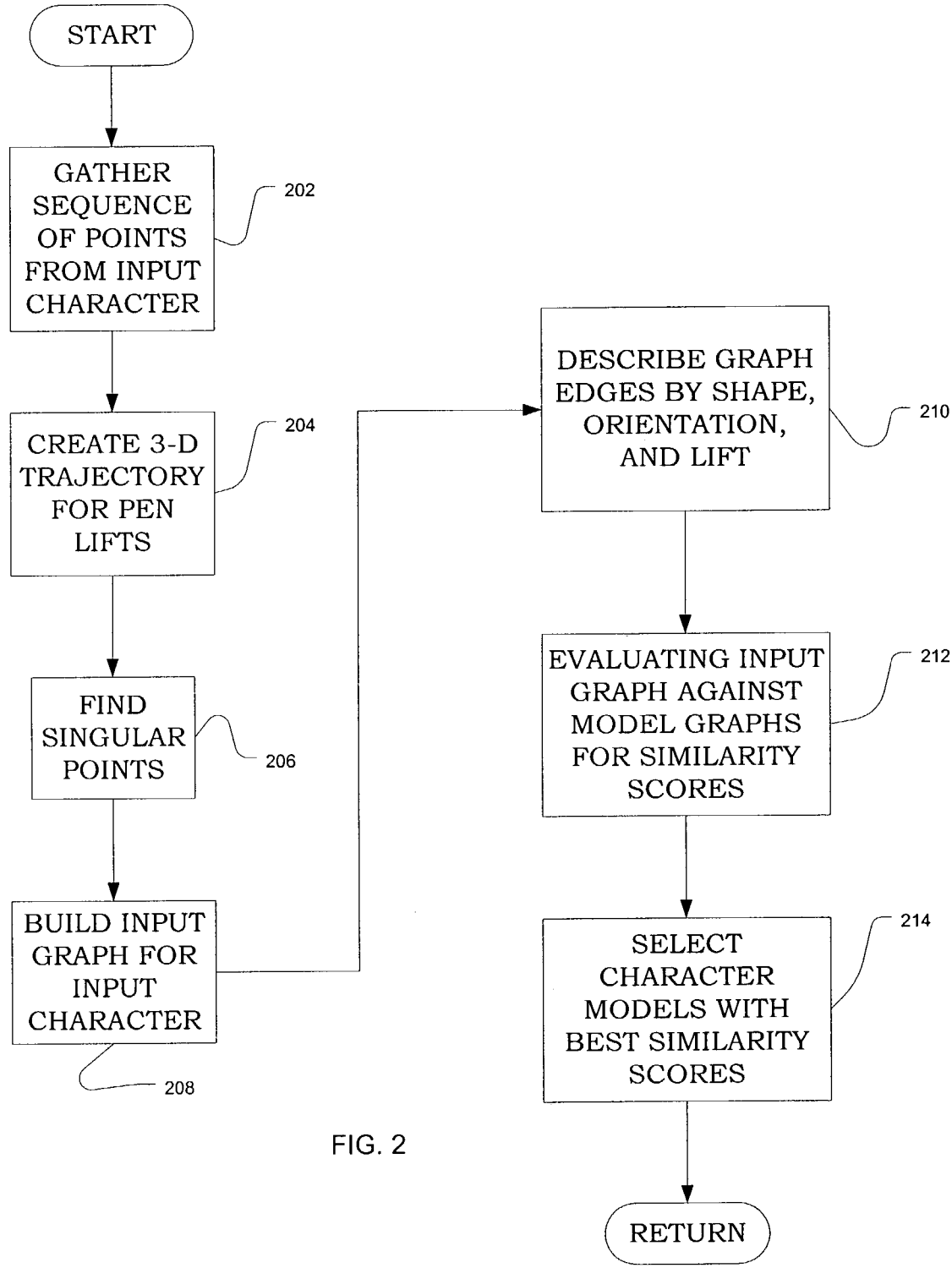
FIG. 2 shows one preferred embodiment of the operational flow for the character recognizer.

FIG. 2 illustrates an operational flow for the character recognizer 112 according to one preferred embodiment of the recognizer. The operations performed in FIG. 2 will be described with reference to a word example "tone" shown in FIG. 3, an example of a segmented character "t" in FIG. 4 from the word in FIG. 3, and an example of an input graph (described hereinafter) in FIG. 5 for the input character "t" of FIG. 4.

Figure 3:
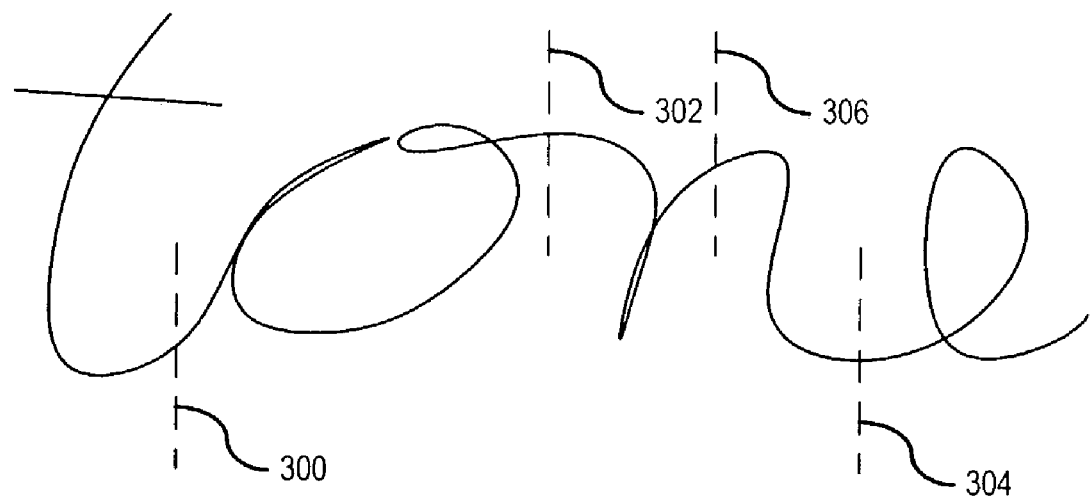
FIG. 3 shows an example of an handwritten word "tone" whose characters are to be recognized.

In FIG. 3 the example word "tone" is shown handwritten with segmentation points 300, 302, and 304. Of course, the segmentation process may choose other segmentation points such as segmentation point 306. Segmentation point 306 might be in addition to or in lieu of segmentation point 304. For example, if only segmentation points 302 and 304 are used, then the last two characters will be "ne". If segmentation point 306 is used in lieu of segmentation point 304, then the last two characters will be "vu". Finally, if all three segmentation points 302, 304, and 306 were used, the last two characters might be interpreted as three characters "vie". Each of these character possibilities can be processed, and after character recognition occurs for each segmentation possibility, a word recognition process would be performed by the character recognition data user 118 in FIG. 1.

Figure 4:
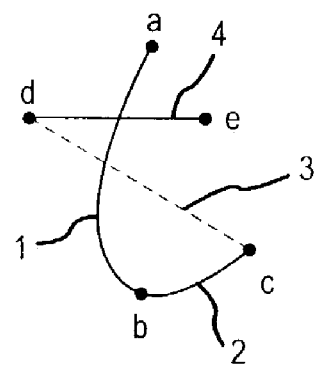
FIG. 4 shows the character "t" segmented from the word "tone" in FIG. 3 and the singular points and trajectory segments between the singular points that make up the character.

For purposes of describing the operations in FIG. 2 we will assume that the input character is the handwritten character "t" shown in FIG. 4—the first segmented input character from FIG. 3. In FIG. 2 the gather operation 202 retrieves from digitized data 108 (FIG. 1) a sequence of X-Y location points that trace the trajectory of the input character. In this example gather operation 202 gathers or retrieves all of the X-Y points making up the character "t" shown in FIG. 4.

In FIG. 4 the letter "t" is made up of singular points, or significant points, which include a beginning point of a character stroke, an end point of a character stroke, and curvature points during a stroke of the character where the trajectory of the character changes significantly. In FIG. 4 the letter "t" has five singular points—a (beginning point of a first stroke), b (curvature point), c (end point of the first stroke), d (beginning point of a second stroke), and e (end point of the second stroke). The sequence of points between these singular points form the trajectory segments of the character. Thus, in FIG. 4 the alphabetic letter "t" has trajectory segment 1 between singular points a and b, trajectory segment 2 between singular points b and c, trajectory segment 3 between singular points c and d, and trajectory segment 4 between singular points d and e.

Trajectory segment 3 is a pen lift trajectory between singular point c where the letter "t" was segmented and singular point d, the beginning of the cross stroke, which is also trajectory segment 4. Of course, when the word "tone" in FIG. 3 was handwritten, the cross stroke of the "t" was not performed until after the entire word was written. However, for purposes of performing the character recognition the cross stroke—trajectory segment 4—will be processed as if the pen lift occurred at the singular point c and pen landing occurred at singular point d, the beginning of the cross stroke for the "t".

Create operation 204 creates a predetermined three-dimensional trajectory segment for the pen lift from point c to point d in FIG. 4. The trajectory shape is defined simply as a rise followed by a drop, i.e. a triangular trajectory out of the X-Y plane along the path from pen lift point to pen landing point. Accordingly, the create operation 204 will create one trajectory for the pen lift trajectory segment 3 in FIG. 4.

Find operation 206 in FIG. 2 locates the singular points in the character. As mentioned above, there are five singular points in the character "t" in FIG. 4. Point a is the beginning singular point for a first stroke at the beginning of the "t", point b is a singular point, where there is a significant change in the trajectory of the first stroke from down to up, and point c is a singular point as it is the end point of the first stroke. Point d is a singular point as it is the beginning of the second stroke of the character, and point e is the end singular point for the character for the second stroke of the character. The change in trajectory at point b may be determined a number of ways as by measuring the approach trajectory and departure trajectory at each point along the trajectory of the character. Another possibility would be measuring the angle of tangent at each point and looking for a significant change in direction of the tangent from a previous point or to the next succeeding point. Another possibility would be to look for a point related to a local maximum or minimum height of the trajectory of a stroke.

With the singular points identified and the trajectories between singular points known, build operation 208 builds an input graph for the input character. The input graph for the input character is defined as follows. There is a node in the graph for each singular point in the input character. There is an edge depicted as a line connected between nodes; the edge represents the trajectory between the singular points represented by the nodes.

Figure 5:
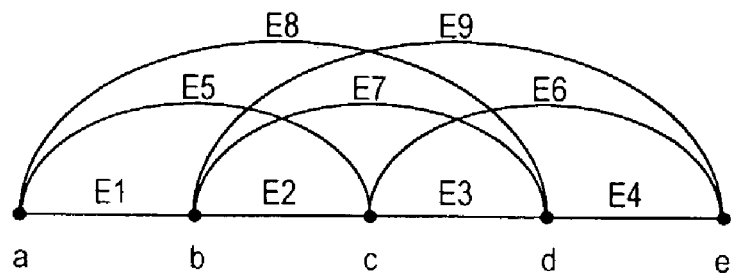
FIG. 5 shows an exemplary input graph for the character in FIG. 4.

For example, in FIG. 5 there is an illustration of a possible input graph for the input character "t" in FIG. 4. The first order graph is represented by edge E1 connecting nodes a and b, edge E2 connecting nodes b and c, edge E3 connecting nodes c and d, and edge E4 connecting nodes d and e. These edges contain values representative of the trajectory segment that they correspond to in FIG. 4. For example, edge E1 corresponds to the trajectory segment 1 in FIG. 4, and edge E2 corresponds to the trajectory segment 2 in FIG. 4. These trajectory segments between singular points also may be referred to as edge trajectories to distinguish them from the character trajectory for the entire character.

A second order edge in FIG. 5 would be edges E5 between nodes a and c, edge E7 between nodes b and d, and edge E6 between nodes c and e. In other words, a second order edge corresponds to an edge or trajectory segment containing two first order trajectory segments. For example, edge E5 contains values representative of the serial combination of trajectory segments 1 and 2 in FIG. 4.

Lastly, the input graph in FIG. 5 contains two third order trajectories. A third order trajectory is a combination of three single order trajectory segments. Thus, third order trajectory segment E8 contains values representative of trajectory segments 1, 2, and 3 in FIG. 4, and edge E9 contains values representative of trajectory segments 2, 3, and 4 in FIG. 4.

Not all edges will be accepted as will be described hereinafter. Some edges represent combinations of trajectory segments that are too complicated to be useful in recognizing the character. For example, it is probable that edge E8 and edge E9 may not be used as the trajectories they represent are such complex shapes.

The input graph in FIG. 5 represents possible descriptions of the character "t" in FIG. 4. Each description is a path through the input graph from node a to node e. Thus the single order path is E1, E2, E3, E4. A second order path might be E1, E7, E4, or it might be E5, E6, or E1, E2, E6, or E5, E3, E4. Any of these paths might be used as a description of the character "t" for later processing and recognition of the character. Of course, a path E8, E4 could also be used, or a path E1, E9 could be used, but as mentioned above, the combined trajectories for edges E8 or E9 are probably too complex to be useful.

Returning again to FIG. 2, now that an input graph of the input character has been built it is necessary to describe the edges E1 through E9 for subsequent use in recognizing the character. The edge values used in this embodiment of the invention are shape, orientation of the shape, and lift. Lift refers to a value that indicates the percent of air portion of trajectory, i.e. pen lift, off the writing surface for the trajectory being valued. The describe operation that determines the shape, orientation and lift values for each edge is described hereinafter with reference to FIG. 8.

After each edge in the input graph has shape orientation and lift values assigned to it, the operation flow proceeds to evaluate operation 212. Evaluate operation 212 is looking for a similar path in both the input graph and various character model graphs. There is a model graph for each and all typical characters against which the input character is being evaluated. These model graphs are stored in the character descriptions database 114 in FIG. 1. The creation of these model character graphs will be described hereinafter with reference to FIG. 10.

Figure 6:
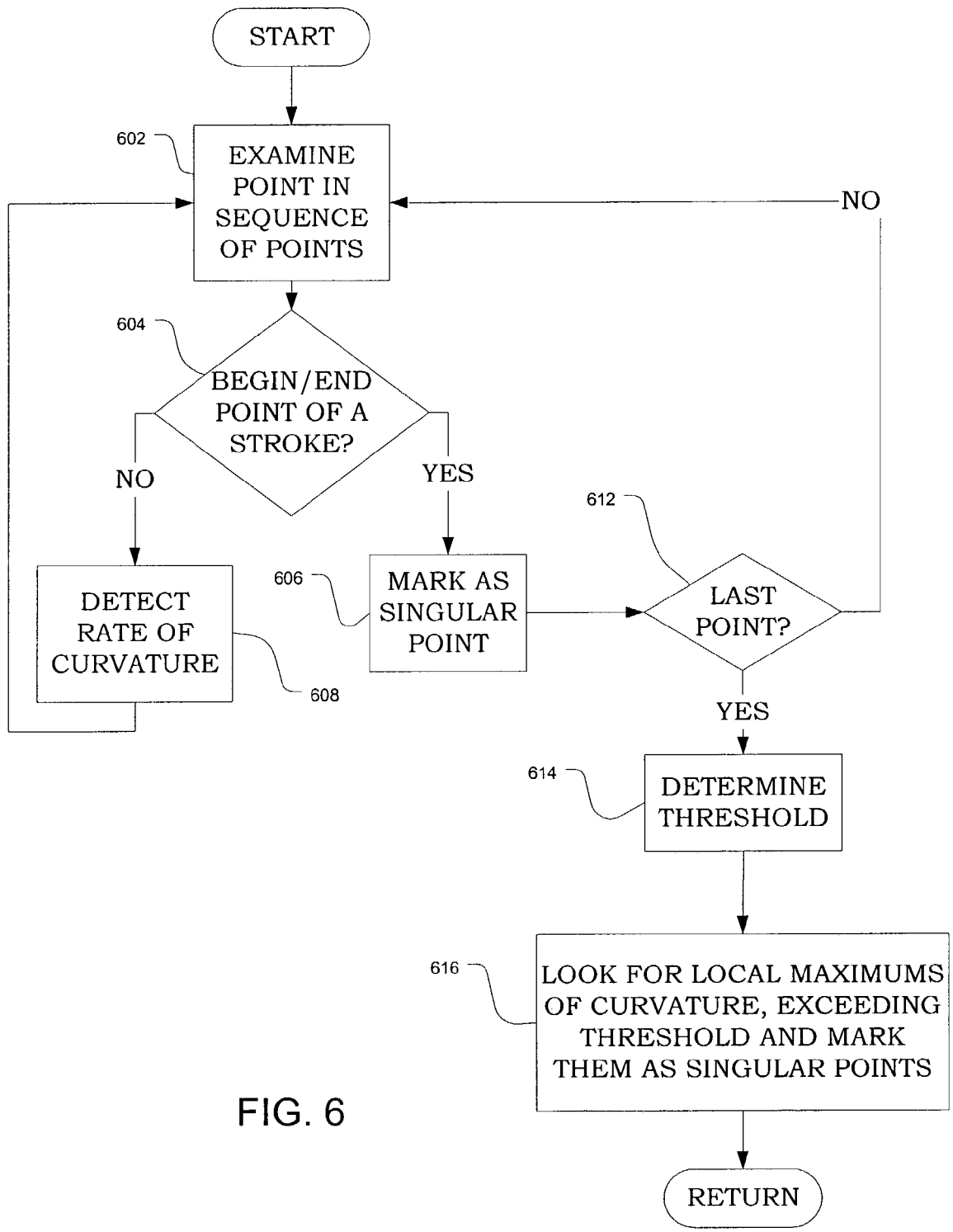
FIG. 6 shows one embodiment of the find singular points operation 206 in FIG. 2.

Evaluate operation 212 evaluates the input graph against each character model graph. The evaluate operation 212 is described in more detail hereinafter with reference to FIG. 9. The evaluate operation finds the best match (highest similarity score) comparing corresponding edges of substantially similar paths through the input graph and model graphs. The best similarity score between the input graph and the model graph is stored until all models have been evaluated against the input graph. Select operation 214 then selects various character models with the best similarity scores as variants of the recognition answers for the input character. These recognition character answers are stored with similarity score values for subsequent use by the character recognition data user 118 in FIG. 1. The data user 118 will use the character recognition data 116 to ultimately recognize the word in which the character appears. With this overview of the operations performed by a preferred embodiment of the invention in mind, the more complex operations in FIG. 2 will now be described in detail. FIG. 6 illustrates one embodiment of find operation 206 as it identifies and marks the singular points in the input character trajectory. The operation flow begins with examine operation 602 sequentially examining each point in the sequence of points making up the trajectory of the input character. The first point examined would typically be the begin point of the trajectory, although it could be the end point of the trajectory. Point test operation 604 is testing whether the point being examined is a begin or end point. If it is a begin or end point, the operation flow branches "yes" to the mark operation 606, which marks the point as a singular point. If the point being examined is not a begin or end point, then the operation flow branches "no" to curvature detect operation 608.

Curvature detect operation 608 detects the rate of curvature at the point. This can be done by comparing the angles of straight lines drawn to adjacent points before and after the point under examination. Based on these angles a curvature rate can be determined, and stored for later use. Since the point under examination is not the last point, upon determining the curvature rate, flow branches back to examine operation 602 to examine the next point.

As stated above, if the point is a begin or an end point of a stroke, flow branches "yes" from operation 604 and mark operation 606 marks the point as a singular point. Upon marking the point as a singular point, test operation 612 determines if the point being examined is the last point. Last point test 612 is detecting whether more points are to be examined or whether all points along the trajectory of the input character have been examined. If there are more points to examine, then the operation flow branches "no" back to examine operation 602 to examine the next point. If all points have been examined, then the operation flow branches "yes" to determine theshold operation 614.

Determine theshold operation 614 determines the curvature theshold. This threshold value is programmable and would be set in a manner to clearly distinguish when a significant change in direction of the trajectory of the character has occurred at the point under examination.

Next, look operation 616 evaluates the points and their corresponding rates of curvature. Using these rates, look operation further determines the points with the local maximums of curvature that exceed the threshold determined at operation 614 and marks them as singular points.

Following look operation 616 the program flow returns to the main recognition operation flow.

Figure 7:
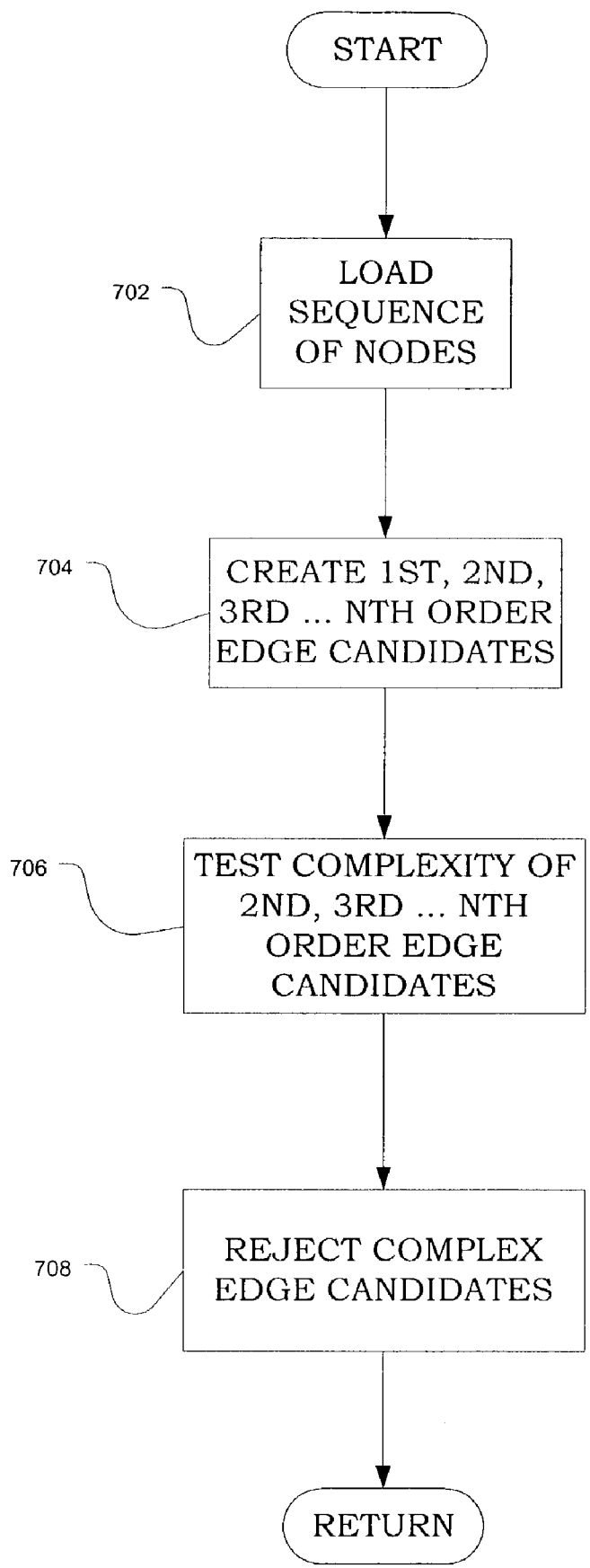
FIG. 7 shows one embodiment of the build input graph operation 208 in FIG. 2.

Build input graph operation 208 in FIG. 2 is shown in detail in the operational flow of FIG. 7. The operations in FIG. 7 begin at load operation 702. Load operation 702 loads the sequence of nodes. The nodes are the singular points determined by find operation 206 as just described in detail in FIG. 6. A node is loaded for each singular point and they are loaded in sequence from the begin point of the character trajectory to the end point of the character trajectory.

Edge candidate create operation 704 creates the edge candidate for the edges between nodes. First, second and third order candidates are created in the preferred embodiment; however, any number of orders of edge candidates could be created. The order of an edge candidate reflects the number of trajectories between nodes. Thus, a first order has one trajectory between each node. A second order trajectory has two trajectories between nodes, i.e. jumps over a node. A third order trajectory has three trajectory segments between nodes, i.e. it jumps over two nodes.

After all of the edge candidates have been created then the candidates are tested for complexity. Complexity test operation 706 evaluates whether the trajectory in the edge candidate is so complex that a shape value is unlikely to be found in trying to describe the edge candidate. If it is determined that the shape of the edge candidate is too complex, then operation 708 rejects the complex edge candidate. The operational flow in FIG. 7 is depicted as a single flow creating all of the edge candidates testing all of their complexity in rejecting the complex edge candidates. Of course, this flow could be done in an iterative fashion creating each edge candidate, testing it and accepting or rejecting it before looping back to create the next edge candidate.

Once the edge candidates have been created describe operation 210 (FIG. 2) will describe each edge according to shape, orientation of the shape, and lift values. The describe operation 210 is shown in more detail in the operational flow of FIG. 8.

Figure 8:
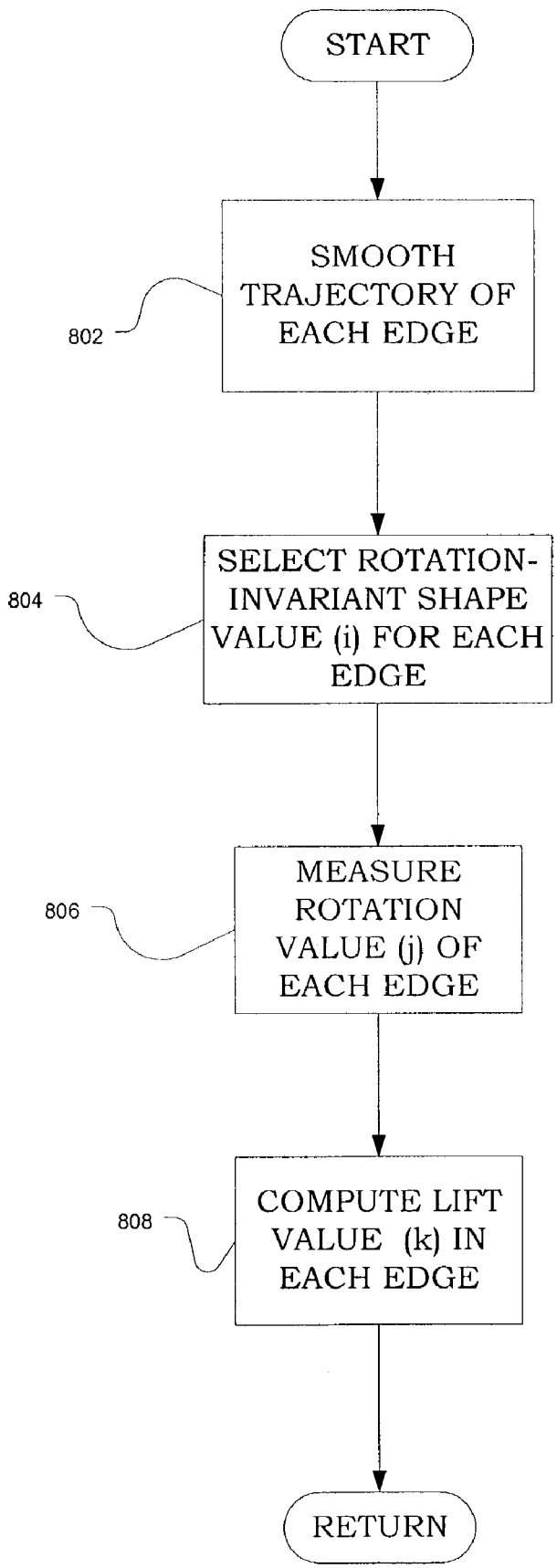
FIG. 8 shows one embodiment of the describe graph edges operation 210 in FIG. 2.

In FIG. 8 the describe edges operational flow begins by finding a smooth transform for the trajectory of each edge. This might be done by taking the three simplest or base cosign coefficients of the transform of the edge trajectory and using that to approximate the edge trajectory. This will have the effect of smoothing the trajectory. After the smooth transform operation 802 shape select operation 804 will compare the shape of the edge trajectory to shapes stored in the descriptions database 114 (FIG. 1). The shape of the trajectory is compared irrespective of the rotation of the shape when compared to the shape stored in the database. Once the shape is selected then a shape value "i" is assigned to the edge.

Measure rotation operation 806 takes the orientation of the shape for the edge and assigns a rotation value "j" for the edge. The rotation of the edge may be found a number of ways but in the preferred embodiment the rotation of the trajectory that the edge represents is found by projecting the shape of the trajectory onto a line as the line rotates 360 degrees in fifteen degree increments. At each position of the line the shape of the trajectory is projected onto the line. The line on which the projection of the shape has the greatest length will be the orientation line indicative of the rotation of the shape. Those skilled in the art may recognize that another process of determining the position of such a line is the "principal axis" method. That edge for that trajectory is then assigned the value corresponding to the orientation of the line.

With the shape and the rotation of the edge defined the remaining value to be determined is the lift. Compute lift operation 808 computes the percentage of the trajectory for the edge that is off the writing surface. If the edge represents a lift trajectory of first order, then, of course, the lift or air percentage will be 100 percent. For trajectories that are the combination of a lift edge then the percentage of air or lift will be less than 100 percent. The lift value "k" will simply be a number representing one of eight possible percentages of lift or air. The percentage is computed simply by summing the trajectory of lift with the trajectory that is in the writing surface and then dividing by their combined length. After all of the edge values, shape, rotation, and lift have been determined for all edges the operation returns to the main program flow. As shown and described for FIG. 8, the values are computed for all edges in the input graph. This can be done in an iterative process or in a process where all shape values are computed, then all rotation values are computed and, finally, all lift values are computed.

Figure 9:
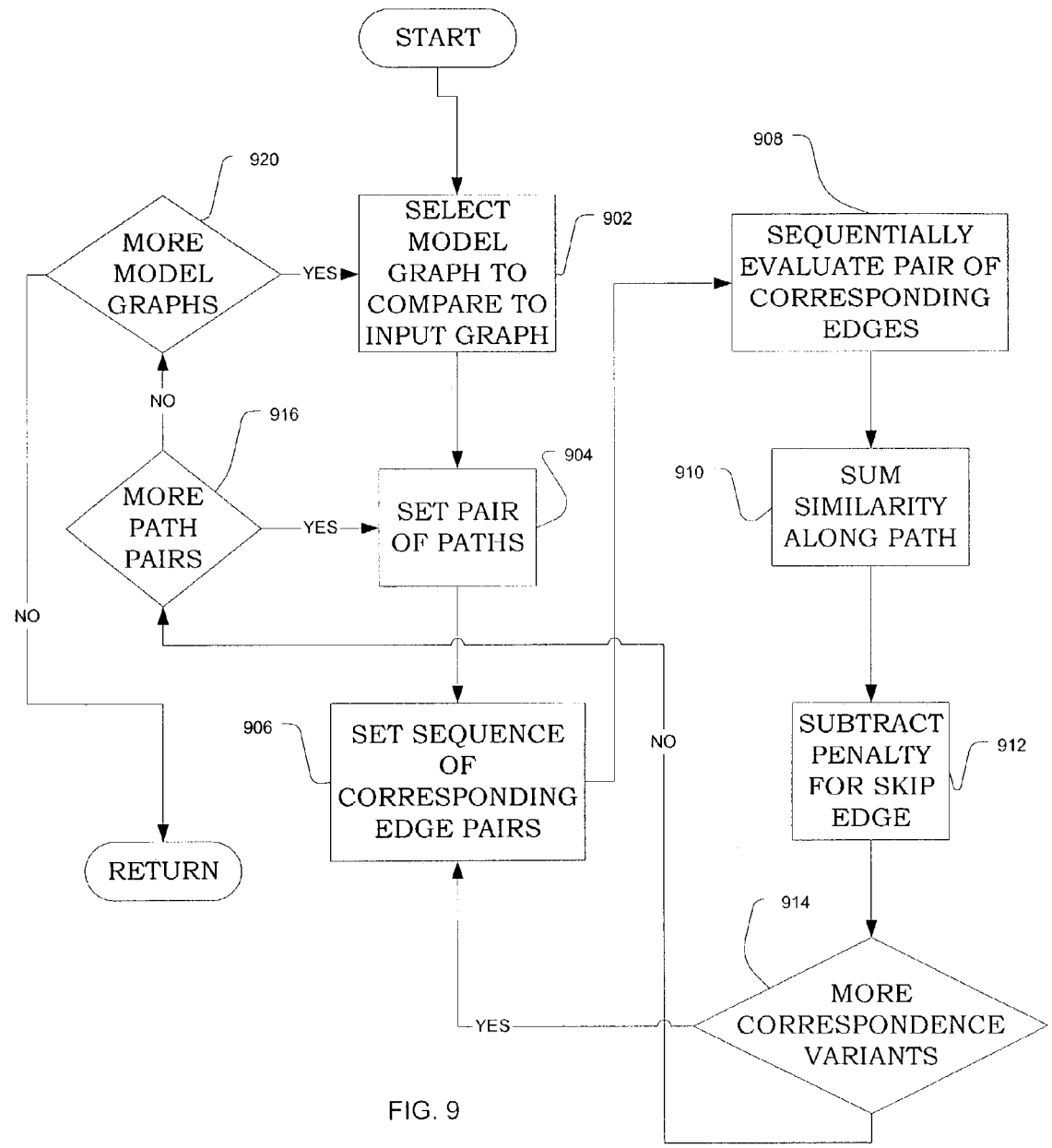
FIG. 9 shows one embodiment of the evaluate input graph operation 212 in FIG. 2.

FIG. 9 illustrates the operational flow for one preferred embodiment of the evaluate input graph operation 212 in FIG. 2. The operational flow begins with load model graph operation 902. There will be a model graph for each alphanumeric character or symbol that is to be used by the on-line character recognizer in recognizing the handwritten input character. Each model character graph has ijk tables for each edge of the model graph. An example of the ijk tables is shown in FIG. 10. There are 128 entries in the i table 1002, 25 entries in the j table 1004, and 8 entries in the k table 1006. There is a set of these tables for each edge in the model graph for this character. In the i table the i value 0 through 128 assigned to the edge will have stored in its table a similarity value for each i value. The similarity value is a measure of the similarity of shape of the model character trajectory for that edge to a standard shape identified by the i value. As depicted in the table 1002, the $38^{th}$ shape indicated by i value 38 has a similarity value of 95 for the trajectory of the edge represented by the i table. Likewise, the shapes corresponding to i value 4 have only a similarity value of 18 to the trajectory of the model character edge.

The j table in FIG. 10 has 25 entries, j value 0 to j value 24. As described above, the j value represents the orientation of the shape of the trajectory represented by the edge. Twenty-four of these entries represent different rotations around 360 degrees spaced at 15 degree intervals. The last entry in the j table, entry 24, as a value for j represents no clear orientation. For example, an "o" or a "0" if nearly round will not have a clear orientation. For each of the j values 0 through 24 there is a similarity value entered in the table. This similarity value, again, represents the similarity of the trajectory represented by the edge to an orientation for that trajectory in a standard model character.

Lastly, the k table 1006 in FIG. 10 represents the lift or air percentage values and has 8 entries, 1 through 8. These entries represent a percentage of air in 12½ percent increments. For each entry in the k table there is a similarity value that indicates the similarity between the air percentage represented by the k value, 1 through 8, to the lift or air percentage of the actual trajectory represented by the edge for the model character. Accordingly, these i, j and k tables for each edge in the model graph are loaded with the model graph for use in evaluating the input graph against the model graph.

After the load operation 902 the set operation 904 selects a pair of paths—one in the model and one in the input graph—for comparison. There will be multiple paths available through each input graph and each model graph. One path from each of the input graph and the model graph is selected at a time for comparison.

Sequence set operation 906 sets the sequence of corresponding edge pairs in the two selected paths to be compared. The sequence will flow from left to right or from first node to last node in the graphs.

Sequential evaluate operation 908 evaluates the corresponding edges or edge pairs. This is accomplished as follows. For each edge pair the edge of the input graph provides i, j, and k values. These values are used to address the i, j, and k table for the corresponding or paired edge in the model graph. The similarity values read from the i, j, and k tables for the i, j, and k value from the input edge are summed. This sum represents a similarity score for the edge pair.

Path sum operation 910 sums the edge similarity scores for all edge pairs along the pair path. The cumulative sum is the path similarity score.

Not all paths paired through the input and model graphs will necessarily have the same number of edges. In effect there is an unbalanced pair path—different number of edges in the paths of the pair. For example, there might be four edges in the model graph and five edges in the input graph. If this occurs, then one of the edges of the input graph will be skipped during the setting of sequence of corresponding edge pairs for comparison. Penalty operation 912 subtracts a penalty in the event that there is a skipped edge during the sequential evaluation of edge pairs. This comes off of the path similarity score to reduce that score. Eventually the goal is to find the highest similarity score for all paths through all model characters as evaluated against the input graph. That best similarity score will then indicate a best candidate as a model character for the identification of the input character.

After there is the adjustment of penalty for skipped edges, then test operation 914 tests whether there are more correspondent variants. In other words, are there more variations on skipped edges that should be evaluated? If there are more skipped edges, then the operation flow loops back to set sequence of edge pairs operation 906. In this return to set sequence the edge that is skipped is shifted in sequence from the previous sequential evaluation. The evaluation 908, 910, 912 is repeated and the loop of trying different corresponding edges for the skipped edge is repeated until all positions have been tried. Once all correspondent variants of the skipped edge have been tried, the operation flow branches "no" to more path pairs test 916. If not all the path pairs between the input graph and model graph have been tried, then the operation flow branches "yes" to return the flow to pair path set operation 904. The pair path set operation then selects a new pair of paths, one in the input graph and one in the model graph, for comparison. The operation flow then proceeds to the set sequence for edge pairs and the evaluation loop for this pair path repeats until all variations for skipped edges have been completed. The operation flow then returns to the more path pairs test operation 916 to determine if there are more path pairs to be evaluated. One could evaluate all possible path pairs, but this would be extremely burdensome. Alternatively, dynamic programming may be used to accomplish the equivalent of a comparison of all the path pairs and all variants of skipping edges in each path pair. Dynamic programming is described in the above referenced publication of by I-John Lin and S. Y. Kung (IEEE Transactions on Signal Processing, 45(11):2701–8, November 1997.

When all selected path pairs have been evaluated the operation flow branches "no" from test operation 916 to more model graphs test operation 920. This would occur when testing or evaluating of the input graph against a particular model graph has been completed. If there are more model graphs to be evaluated against the input graph, the operation flow branches "yes" from test operation 920 to the load operation 902 to load the next model graph. The evaluation of that model graph against the input graph will cycle through until all of its pair paths and correspondents edge pairs have been evaluated. When the comparison of that model graph against the input graph is complete the operation flow returns to more model graph test operation 920. If all model graphs have been tested against the input graph, then the evaluation of the input graph is complete and the operation flow branches "no" to return to the main program flow.

Figure 11:
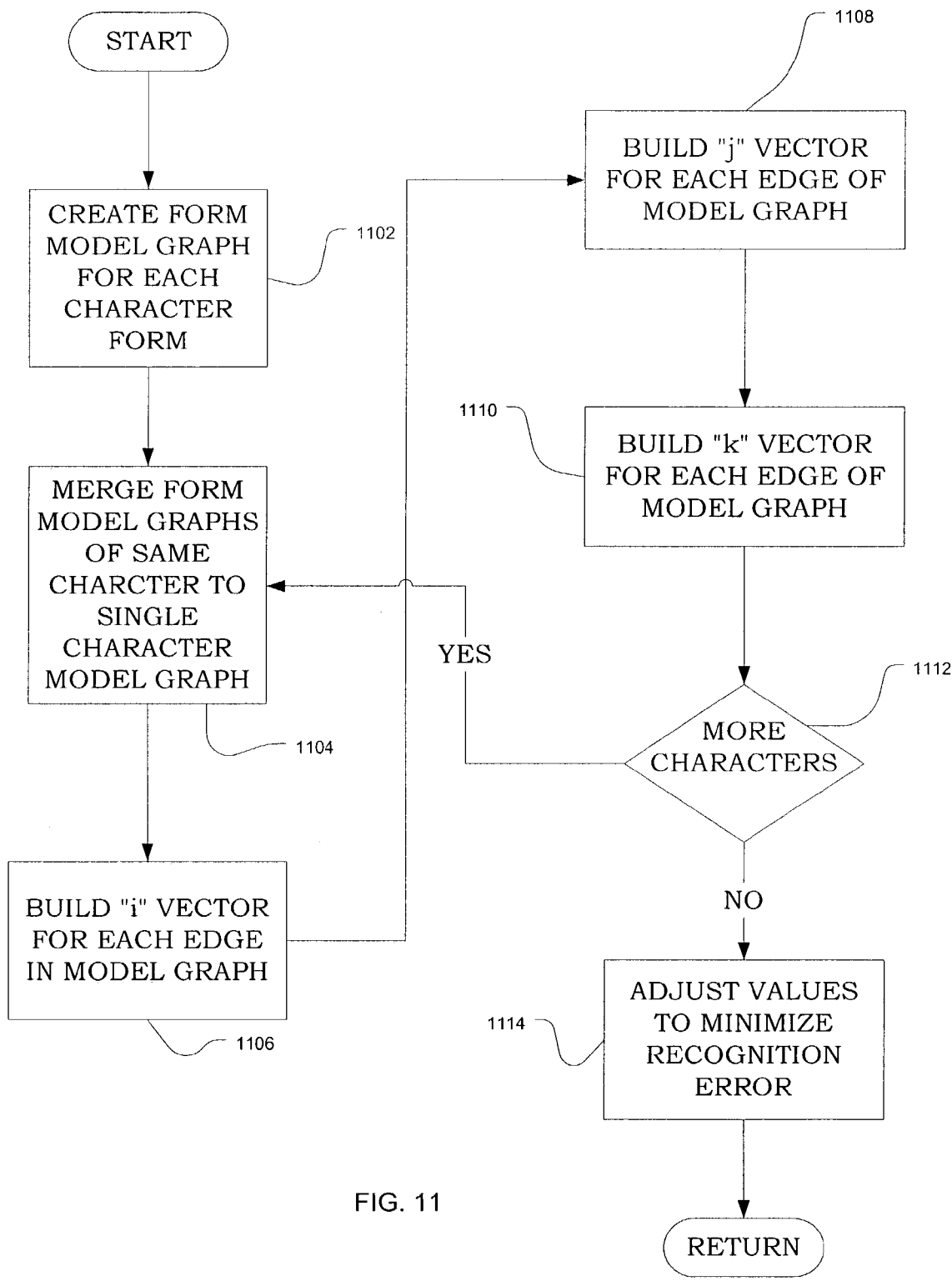
FIG. 11 shows one embodiment of the operational flow for creating a model graph.

The number of model graphs used and the creation of the i, j, k tables for each edge in each model graph can be created by just inputting a number of reference characters and collecting the data. However, the number of possible models and the amount of data collected is quite large. Therefore, it is useful to adopt an operation to create the model graphs that will reduce some of the redundant information and reduce the number of models that must be compared to an input graph. The operations in FIG. 11 show a preferred embodiment for creating the model graphs for reference characters.

Operation 1102 begins the operational flow by creating a model graph for each character form of the same character. To reduce the number of model graphs the character form chosen for graphing is a standardized character. A standardized character meaning one that is a typical handwritten script shaped character and has a high frequency of use. In other words, all characters will be present but unusually shaped characters that are rarely written, or in other words written only by few individuals, will not be modeled.

Another reduction in model graphs can be accomplished by merging model graphs of different forms of the same character to a single model graph for the reference character. For example, the character "a" might be written in various ways. Some typical examples of handwritten "a"s are shown in FIG. 13. Each of these typical character "a"s will have a form model graph created for them by create model graph operation 1102. Merge model graph operation 1104 will take all four of the form model graphs for these four typical alphabetic letter "a"s and merge them into a single model graph for the character "a". This is accomplished by combining redundant edges at the beginning of the model graph or at the end of the model graph. The criterion for combining edges to merge form model graphs into a model graph for the same reference character is (1) minimize the creation of new paths through the model graph, and (2) add new paths so as to not lose any significant information in the merged path by merging common redundant edges at the beginning of the graph and at the end of the graph. The size of the model graph for all forms of the reference character can be kept to a reasonable size.

Once the merged model graph operation is completed then operation 1106 will build the i table for each edge in the model graph. This is accomplished by comparing the trajectory segment, or edge trajectory, represented by each edge to the standard shapes and assigning a similarity value for the shape value i for that edge. The build j table operation 1108 will compare the orientation of the trajectory segment for each edge to 24 possible orientations and enter a similarity value for each rotation value j. This is accomplished for each edge of the model graph. After the j table is built, then build operation 1110 builds the k table for each edge in the model graph. For each lift value k, a similarity value will be loaded in the k table representing the similarity of lift or air percentage of the trajectory segment represented by the edge to a lift percentage for that trajectory segment.

After the i, j, and k tables have been built for each edge of the model graph, the more characters test 1112 detects whether additional characters need to be modeled. If there are more characters to be modeled, then the operation flow returns to merge model graphs operation 1104 to merge the model graph of another set of the same character form model graphs. The building of the tables for each edge in the model graph for a reference character are repeated and the flow returns to the more characters test operation 1112. When all characters have been modeled, merged into a model graph for the same character, and the i,j,k tables built, then the creation of the tables or vectors in models graphs is complete. The operation flow then branches "no" from test 1112 to adjust similarity values operation 1114. The adjust similarity values operation is performed to minimize a recognition error and optimize the differentiation between models as used to recognize input characters. Once the adjustment of similarity values for all of the i, j, k tables for all of the model graphs is completed then the operation flow returns to the main program flow.

Figure 12:
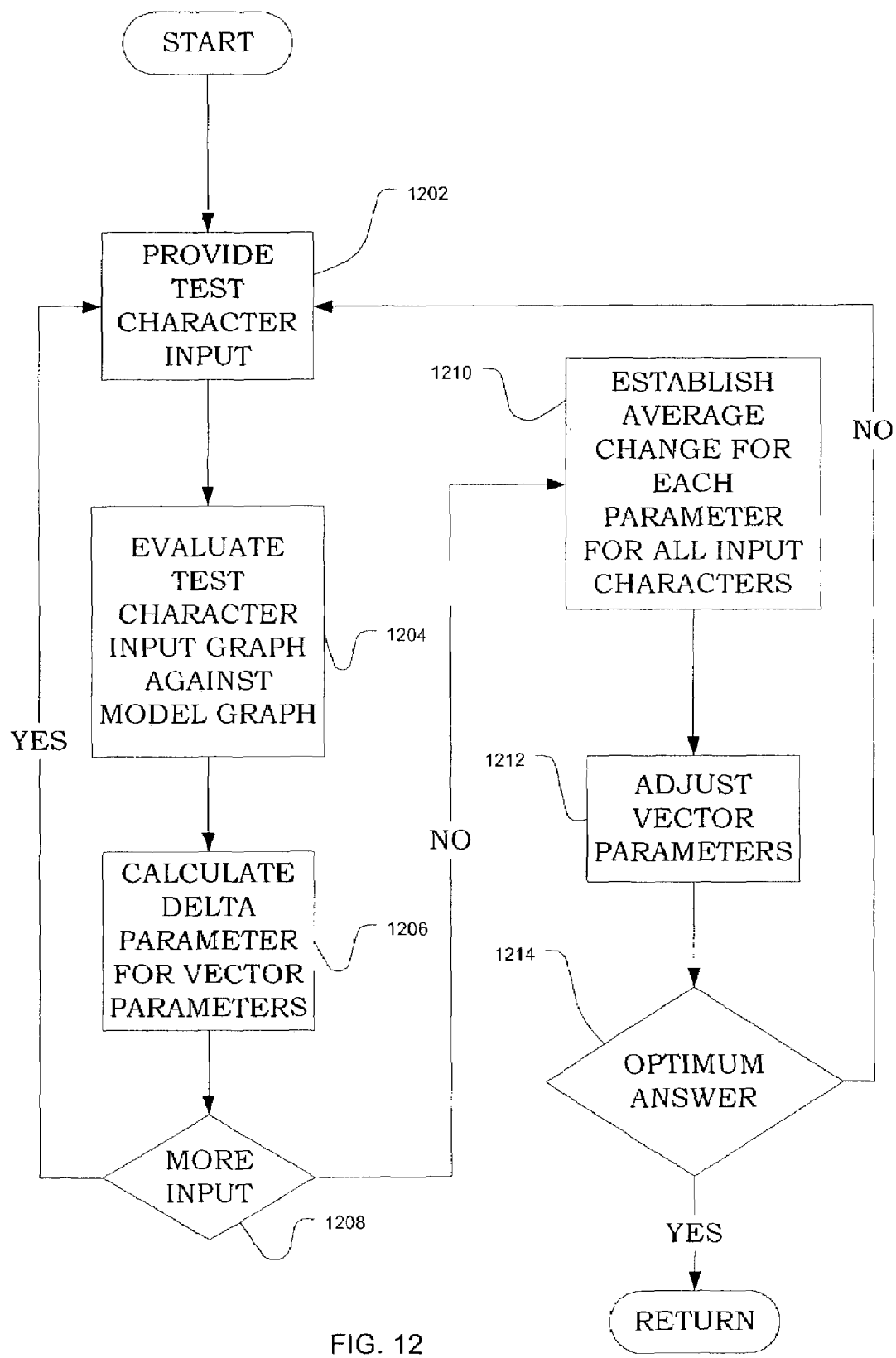
FIG. 12 shows one embodiment of the adjust values operation 1114 in FIG. 11.

FIG. 12 illustrates one preferred embodiment for the adjust similarity values operation 1114 (FIG. 11). The adjustment begins at test character input operation 1202. Operation 1202 provides a test character input graph. Evalulate operation 1204 then calculates a combined similarity score for the test character input graph evaluated against the character model graph. The test characters are selected to enable the creation of model graphs to learn how to set parameters (values) in i,j,k tables to better distinguish between input characters. After the test character input graph is evaluated agains the model graph, the parameters (similarity values) in the i,j,k tables are changed. Test character input test operation 1208 tests whether there are more test characters input graphs for the same character to be evaluated against a character model. If there are more test character input graphs then the operation flow returns to provide operation 1202 to enter the next test character input graph. After all test character input graph variations have been entered and all delta parameter variations have been tried the operation flow branches "no" from more input test operation 1208 to establish average operation 1210.

Establish average operation 1210 averages the change for each similarity value parameter for all of the test input characters applied against the character model graph. This average change is then used by adjust parameters operation 1212 to adjust the similarity of values in the reference character model graph i,j,k tables. Optimum answer test operation 1214 causes the operational flow to enter a reiterative loop to run the tests and adjustments again until the recognition error for the set of input characters starts to increase. The adjustment values operational flow in FIG. 12 is completed, and the operational flow branches "yes" from test operation 1214 to return to the main program flow.

While the invention has been particularly shown and described with reference to preferred embodiments thereof, it will be understood by those skilled in the art that various other changes in the form and details may be made therein without departing form the spirit and scope of the invention.

What is claimed is:

1. A method for recognizing an input handwritten character digitized as a sequence of coordinate points in two dimensional space representative of a trajectory making up an input character, the method comprising:

gathering the sequence of points for the input character;
building an input graph with nodes representative of significant points along the trajectory of the input character and with edges between nodes representative of the trajectory formed by the sequence of points of the input character between the significant points;
describing each edge in the input graph based on the shape and orientation of the trajectory that the edge represents, wherein describing each edge includes determining, for each described edge of the input graph, a character-part shape from one or more codebooks that is closest to a portion of the trajectory represented by that edge;
describing individual edges in one or more model graphs based on a similarity of a given edge in the model graph to multiple shapes in the one or more codebooks;
evaluating the input graph against the one or more model graphs, using the described edges of the input graph and the model graph, for all possible characters to find a model graph having the most similar path to a path of the input graph and identifying the input character as an answer character represented by the model graph with the most similar path.

2. The method of claim 1, wherein determining, for each described edge of the input graph, a character-part shape from a codebook includes:
selecting, from the one or more codebooks, a typical rotation-independent shape for the portion of the trajectory that the edge represents;
assigning to the edge a shape value representative of the typical shape;
measuring an orientation of the portion of the trajectory that the edge represents;
and assigning to the edge a rotation value indicative of the orientation of the shape.

3. The method of claim 1, wherein determining, for each described edge of the input graph, a character-part shape from a codebook includes:
calculating an air portion of the trajectory that the edge of the input graph represents, the air portion being that portion of the trajectory where the pen is lifted off of the two dimensional space of the input character, and
assigning to the edge an air percentage value indicative of the air portion.

4. The method of claim 1, further comprising:
identifying the significant points of the trajectory of the input character based on the rate of curvature of each of the points in the sequence of points making up the character.

5. The method of claim 1, wherein evaluating the input graph against the one or more model graphs includes:
finding corresponding best paths through the input graph and model graph based on the similarity of edges along the corresponding paths.

6. The method of claim 1, further comprising:
creating a model graph for each character against which the input graph is evaluated to find an answer character.

7. The method of claim 1, wherein gathering the sequence of points for the input character includes receiving any one of a cursive or mixed handwriting character set.

8. The method of claim 1, further comprising: building a 3-dimensional trajectory by (i) connecting a last point of each stroke in the input trajectory and a first point of the next stroke by a segment comprising one or more artificial air points, and (ii) assigning a zero value of a third coordinate to original points and a non-zero value of a third coordinate to the one or more air points; and
wherein building an input graph with nodes representative of significant points along the trajectory includes building the input graph with nodes that are representative of significant points along the 3-dimensional trajectory.

9. The method of claim 1, wherein describing each edge in the input graph includes describing each edge (i) as a first shape from a shape codebook, the first shape from the codebook being closest to the trajectory represented by said edge; (ii) as a first orientation from an orientation codebook, the first orientation being closest to the trajectory represented by said edge; (iii) as a given air percentage value from an air percentage codebook, the given air percentage value being closest to a trajectory represented by said edge.

10. The method of claim 9, wherein describing individual edges in one or more model graphs includes identifying a shape similarity vector, an orientation similarity vector and an air percentage similarity vector for a given model graph, wherein, together the vectors indicate a similarity of each edge of the model graph to a shape, an orientation, and an air percentage of each typical letter part from a codebook.

11. The method of claim 10, wherein evaluating the input graph against the one or more model graphs includes computing an edge pair similarity score as a sum of the shape similarity value, the orientation similarity value, and the air percentage similarity value for each of the one or more model graphs.

12. The method of claim 1, wherein describing individual edges in one or more model graphs includes:
creating a predetermined number of typical trajectories for each character;
merging input graphs for typical trajectories of one character into one model graph with edges described by one or more parameters, so as to create a compressed generalized description of a set of typical trajectories for each character;
determining a set of similarity vectors based at least in part on the one or more parameters, wherein the set of similarity vectors are characterized by coordinate values that are adjustable to minimize mis-recognition.

13. A method for recognizing an input handwritten character digitized as a sequence of coordinate points in two dimensional space representative of a trajectory making up the input character, the method comprising:
gathering the sequence of points for the input character;
building an input graph with nodes representative of significant points along the trajectory of the input character and with edges between nodes representative of the trajectory formed by the sequence of points of the input character between the significant points;
describing each edge in the input graph based on the shape and orientation of the trajectory that the edge represents;
evaluating the input graph against model graphs for all possible characters to find a model graph having the most similar path to a path of the input graph and identifying the input character as an answer character represented by the model graph with the most similar path;
creating a model graph for each character against which the input graph is evaluated to find an answer character;
creating a form model graph for each character form;
merging form model graphs into a model graph for all character forms of the same character;
describing edges of each model graph based on similarity to multiple typical shapes, orientations, and lifts;
adjusting similarity values of all edges for optimum recognition of input characters.

14. The method of claim 13, wherein describing each edge in the input graph includes:
- selecting a typical rotation-independent shape for the trajectory that the edge represents and assigning to the edge a shape value representative of the typical shape; and
- measuring an orientation of the trajectory that the edge represents and assigning to the edge a rotation value indicative of the orientation of the trajectory.

15. The method of claim 13, wherein describing each edge in the input graph includes:
- calculating an air portion of the trajectory that the edge represents, the air portion being that portion of the 3-dimensional trajectory where the pen is lifted off of the two dimensional space of the input character, and
- assigning to the edge an air percentage value indicative of the air portion.

16. The method of claim 13, further comprising:
- identifying the significant points of the trajectory of the input character based on the rate of curvature of each of the points in the sequence of points making up the character.

17. The method of claim 13, wherein the evaluating the input graph includes:
- finding corresponding best paths through input graph and model graph based on the similarity of edges along the corresponding paths.

18. The method of claim 13, wherein gathering the sequence of points for the input character includes receiving any one of a cursive or mixed handwriting character set.

19. A system for recognizing handwritten characters based on trajectory segments of one or more strokes making up each character, the system comprising:
- a find module that is configured to identify singular points of each character trajectory defining a beginning point and end point of each stroke of the character and points of significant curvature along each stroke of the character, wherein the character trajectory corresponds to any one of a cursive or mixed handwriting character set;
- a graph module that is configured to graph each character as an input graph made up of nodes connected by edges in which each node corresponds to a singular point, each edge corresponds to one or more trajectory segments connecting two singular points;
- an edge definition module that is configured to describe each edge based on the shape, orientation and air percentage value of the trajectory segment associated with the edge; and
- an evaluation module that is configured to evaluate the input graph against all model graphs of a set of reference characters to identify the model graph of a reference character most similar to the input character.

20. The system of claim 19, wherein said characters include alphanumeric characters and symbols.

21. The system of claim 19, wherein said graph module comprises:
- a node assign module that is configured to find all singular points in an input character and assigning a node to each singular point;
- an edge assign module that is configured to create multiple order edge candidates between nodes;
- an edge complexity test module that is configured to test the complexity of each edge; and
- a reject module that is configured to reject complex edge candidates and removing the complex edge candidates leaving the remaining edge candidates as the edges between nodes in the input graph.

22. The system of claim 21, wherein said evaluating module comprises:
- a load module that is configured to load model graphs for evaluation against the input graph;
- pair path evaluating module that is configured to compute the similarity score between edges making up a path in the input graph and edges making up a path in the model graph;
- said pair path evaluating module being configured to repeat the computing operation for the input graph against paths in all model graphs until locating the best path similarity score so as to identify the character most similar to the input character.

23. The system of claim 22, wherein each edge of a model graph includes a shape vector, an orientation vector and an air percentage vector, so that together the vectors indicate the similarity of each edge of the model graph to predefined shapes, orientations, and air percentages and where said path evaluating module is configured to perform steps comprising:
- computing an edge pair similarity score indicative of the similarity of the edge in the input graph and the corresponding edge in the model graph; and
- computing a path similarity score indicative of the similarity of all the edges along a path in the input graph to all corresponding edges along the pair path in the model graph.

24. A system for recognizing handwritten characters based on trajectory segments of one or more strokes making up each character, the system comprising:
- a find module that is configured to identify singular points of each character trajectory defining a beginning point and end point of each stroke of the character and points of significant curvature along each stroke of the character;
- a graph module that is configured to graph each character as an input graph made up of nodes connected by edges where each node corresponds to a singular point, each edge corresponds to one or more trajectory segments connecting two singular points;
- an edge definition module that is configured to describe each edge based on the shape, orientation and air percentage value of the trajectory segment associated with the edge; and
- an evaluation module that is configured to evaluate the input graph against all model graphs of a set of reference characters to identify the model graph of a reference character most similar to the input character;
- wherein said graph module comprises:
  - a node assign module that is configured to find all singular points in an input character and assigning a node to each singular point;
  - an edge assign module that is configured to create multiple order edge candidates between nodes; an edge complexity test module testing the complexity of each edge; and
  - a reject module that is configured to reject complex edge candidates and removing the complex edge candidates leaving the remaining edge candidates as the edges between nodes in the input graph;
- wherein said evaluating module comprises:
  - a load module that is configured to load model graphs for evaluation against the input graph;

a pair path evaluating module that is configured to compute the similarity score between edges making up a path in the input graph and edges making up a path in the model graph;

said pair path evaluating module being configured to repeat the computing operation for the input graph against paths in all model graphs until locating the best path similarity score so as to identify the character most similar to the input character;

wherein each edge of a model graph includes a shape vector, an orientation vector and an air percentage vector, together the vectors indicate the similarity of each edge of the model graph to predefined shapes, orientations, and air percentage values and wherein said path evaluating module is configured to perform steps comprising:

computing a edge pair similarity score indicative of the similarity of the edge in the input graph and the corresponding edge in the model graph; and computing a path similarity score indicative of the similarity of all the edges along a path in the input graph to all corresponding edges along the pair path in the model graph;

where said path evaluating module further comprises:

reducing the path similarity score for a unbalanced pair path where one path of the pair has more edges than the other path of the pair; and varying correspondence between edge pairs in an unbalanced pair path until all variants of edge pairs for the unbalanced pair path have been evaluated for a path similarity score.

25. A computer readable medium readable by a computing system and encoding a computer program of instructions for executing a computer process for recognizing a handwritten input character, said computer process comprising steps that include:

gathering a sequence of points in two dimensional space representative of a trajectory forming the input character;

building an input graph with nodes representative of singular points at the beginning, end, and along the trajectory of the input character and with edges between nodes representative of an edge trajectory formed by the sequence of points of the input character between the singular points;

describing each edge in the input graph based on the shape, orientation and air lift of the edge trajectory that the edge represents, wherein describing each edge includes determining, for each described edge of the input graph, a character-part shape from one or more codebooks that is closest to a portion of the trajectory represented by that edge;

describing individual edges in one or more model graphs based on a similarity of a given edge in the model graph to multiple shapes in the one or more codebooks;

evaluating the input graph against one or more model graphs, using the described edges of the input graph and the model graph, for all possible characters to find a path through a model graph that produces a best path similarity score with a corresponding path through the input graph and identifying the input character as an answer character represented by the model graph.

26. The computer readable medium of claim 25, wherein the computer process further comprises:

examining each point in the sequence of points making up the trajectory of the input character;

marking as singular points, the beginning point and the end point of each stroke of the input character;

detecting a curvature rate for each examined point along the sequence of points, the curvature rate indicating the rate of change of direction of a stroke of the input character at the examined point; and marking as singular points each examined point whose curvature rate exceeds a predetermined threshold value.

27. The computer readable medium of claim 25, wherein the step of describing each edge in the input graph includes:

smoothing each edge trajectory;

selecting a rotation-invariant shape value (i) for each edge based on the edge trajectory associated with the edge;

measuring a rotation value (j) for each edge based on the rotation of the shape of the edge trajectory associated with the edge; and computing an air percentage value (k) as the length percentage of the air portion of the 3-dimensional trajectory of the input character associated with the edge.

28. The computer-readable medium of claim 27, wherein the step of evaluating the input graph includes:

loading model graphs of different characters where each model graph for a character is a generalized description of several input graphs created for several pre-selected trajectories of this character, and where each edge of the model graph corresponds to a part of the character, and further each edge of the model graph includes an "i" vector, a "j" vector and a "k" vector, the "i,j,k" vectors indicating similarity values for the character part, associated with the edge of the model graph, to typical shapes, typical orientations and typical air percentages, respectively;

setting a pair path, one path each in the input graph and a model graph, for evaluation of corresponding edge pairs along the two paths;

sequentially evaluating each edge pair along the pair path based on the "i,j,k" values of the edge in the input graph and the "i,j,k" vectors in the model graph to provide an edge similarity value for each edge pair;

summing the edge similarity values for all edge pairs along the pair path and generating a pair path similarity value;

repeating the acts of setting, sequentially evaluating and summing until all selected pair paths for the input graph and all model graphs have been evaluated; and selecting an answer character for the input character based on the model graph producing the best pair path similarity value with the input graph.

29. The computer-readable medium of claim 28, wherein the step of evaluating the input graph includes:

subtracting a penalty for a skipped edge from the sum of edge similarity values, when the path in the input graph and the path in the model graph do not have the same number of edges, to generate the path similarity value;

setting correspondence of edge pairs to another skipped edge variation for the pair path; and repeating the acts of sequentially evaluating, summing edge similarity values, subtracting a penalty, and setting correspondence, until all skipped edge variations of the pair path have been evaluated.

30. The computer-readable medium of claim 28, wherein the "i,j,k" vectors are "i,j,k" tables of similarity values indexed by "i,j,k" values respectively and the step of sequentially evaluating the input graph includes: looking up the "i"th entry in the "i" table of an edge in the model graph to retrieve a similarity value for the shape value "i" of a corresponding edge in the input graph;

looking up the "j"th entry in the "j" table of the edge in the model graph to retrieve a similarity value for the rotation value "j" of the corresponding edge in the input graph;

looking up the "k"th entry in the "k" table of the edge in the model graph to retrieve a similarity value for the lift value "k" of the corresponding edge in the input graph; and summing the similarity values retrieved from the "i,j,k" tables to generate the edge similarity value.

31. The computer-readable medium of claim 30, wherein the computer process further comprises steps that include:

creating an input graph for each reference trajectory of a character;

merging created input graphs for all reference trajectories representing the same character into a model graph for this character;

building the "i,j,k" tables for each edge in the model graph for the reference character; and adjusting the similarity values in the "i,j,k" tables to minimize recognition error.

32. The computer-readable medium of claim 31, wherein the step of adjusting the similarity values include:

providing a test input graph for a test character;

evaluating the test input graph against the model graph;

adjust similarity values in "i,i,k" tables to minimize recognition error;

repeating above steps for all test input graphs and averaging change for each similarity value; and repeating above process until final answer is optimum.

33. A method for recognizing an input handwritten character digitized as a sequence of coordinate points in two dimensional space representative of a trajectory making up the input character, the method comprising the acts of:

gathering the sequence of points for the input character;

building an input graph with nodes representative of significant points along the trajectory of the input character and with edges between nodes representative of the trajectory formed by the sequence of points of the input character between the significant points;

describing each edge in the input graph based on the shape and orientation of the trajectory that the edge represents;

evaluating the input graph against model graphs for all possible characters to find a model graph having the most similar path to a path of the input graph and identifying the input character as an answer character represented by the model graph with the most similar path;

creating a model graph for each character against which the input graph is evaluated to find an answer character wherein describing each edge in the input graph includes calculating an air portion of the trajectory that the edge represents, the air portion being that portion of the trajectory where the pen is lifted off of the two dimensional space of the input character, and assigning to the edge an air percentage value indicative of the air portion.

34. The method of claim 33, wherein gathering the sequence of points for the input character includes receiving any one of a cursive or mixed handwriting character set.

* * * * *